United States Patent
Chan et al.

(10) Patent No.: US 10,340,689 B2
(45) Date of Patent: Jul. 2, 2019

(54) SYSTEM AND METHOD FOR POWER MANAGEMENT

(71) Applicant: NXP B.V., Eindhoven (NL)

(72) Inventors: Shufan Chan, Milpitas, CA (US); Nicholas Seroff, San Jose, CA (US); Kisun Lee, Pleasanton, CA (US); Chae Kun Lee, San Jose, CA (US)

(73) Assignee: NXP B.V., Eindhoven (NL)

( * ) Notice: Subject to any disclaimer, the term of this patent is extended or adjusted under 35 U.S.C. 154(b) by 122 days.

(21) Appl. No.: 15/331,581

(22) Filed: Oct. 21, 2016

(65) Prior Publication Data

US 2018/0115157 A1    Apr. 26, 2018

(51) Int. Cl.

| | |
|---|---|
| H02J 1/10 | (2006.01) |
| H02J 3/38 | (2006.01) |
| H02J 1/00 | (2006.01) |
| H02J 7/00 | (2006.01) |
| H02M 7/04 | (2006.01) |
| H02M 1/00 | (2006.01) |

(52) U.S. Cl.
CPC .............. *H02J 1/00* (2013.01); *H02J 7/0052* (2013.01); *H02J 7/0054* (2013.01); *H02M 7/04* (2013.01); *H02J 2007/0062* (2013.01); *H02M 2001/0045* (2013.01); *H02M 2001/0054* (2013.01); *Y02B 40/90* (2013.01); *Y02B 70/1491* (2013.01)

(58) Field of Classification Search
CPC .... H02J 1/00; H02J 7/0052; H02J 2007/0062; H02M 7/04
USPC ........................................................... 307/52
See application file for complete search history.

(56) References Cited

U.S. PATENT DOCUMENTS

| | | | |
|---|---|---|---|
| 6,885,173 B2* | 4/2005 | Lee ..................... | H02M 3/1582 323/241 |
| 7,746,041 B2 | 6/2010 | Xu et al. | |
| 8,212,541 B2 | 7/2012 | Perreault et al. | |
| 2006/0028188 A1 | 2/2006 | Hartular et al. | |
| 2012/0126764 A1* | 5/2012 | Urakabe ................. | H02M 3/07 323/282 |
| 2014/0375280 A1 | 12/2014 | Jung et al. | |
| 2015/0042300 A1 | 2/2015 | Peker et al. | |
| 2016/0190921 A1* | 6/2016 | Kumar .................. | H02M 3/158 323/271 |
| 2016/0254689 A1* | 9/2016 | Lee ....................... | H02M 3/158 320/107 |

* cited by examiner

*Primary Examiner* — Richard Tan

(57) ABSTRACT

One example discloses a power management device, including: a first port configured to be coupled to a first power source; a second port configured to be coupled to a second power source; a switched capacitor converter; and an inductor coupled in parallel with a switch; wherein the switched capacitor converter is coupled between the first port and one end of the inductor coupled in parallel with the switch; and wherein another end of the inductor coupled in parallel with the switch, is coupled between the switched capacitor converter and the second port.

17 Claims, 4 Drawing Sheets

SYSTEM AND METHOD FOR POWER MANAGEMENT

The present specification relates to systems, methods, apparatuses, devices, articles of manufacture and instructions for power management.

SUMMARY

According to an example embodiment, a power management device, comprising: a first port configured to be coupled to a first power source; a second port configured to be coupled to a second power source; a switched capacitor converter; and an inductor coupled in parallel with a switch; wherein the switched capacitor converter is coupled between the first port and one end of the inductor coupled in parallel with the switch; and wherein another end of the inductor coupled in parallel with the switch, is coupled between the switched capacitor converter and the second port.

In another example embodiment, the first power source is at least one of: a power adaptor, an AC:DC adaptor, a rechargeable battery, a mobile device, a computer, or a USB-bus compatible device; and the second power source is at least one of: an energy storage device, a battery, a mobile device, or a USB-bus compatible device.

In another example embodiment, the power management device is configured in a forward mode such that the first power source supplies power to the second power source.

In another example embodiment, the forward mode is a direct second port charging mode: wherein the switch, in parallel with the inductor, is closed, and wherein the switched capacitor converter is configured as a stepdown converter.

In another example embodiment, the forward mode is a limited second port current mode: wherein the switched capacitor converter, inductor and switch are configured as a current source; and wherein the switched capacitor converter and switch are modulated by coarse and fine power controllers respectively.

In another example embodiment, the forward mode is a regulated second port voltage mode: wherein the switched capacitor converter and the switch are configured as a low dropout voltage regulator; and wherein the switched capacitor converter and switch are modulated by coarse and fine power controllers respectively.

In another example embodiment, the power management device is configured in a three-level buck mode such that the first power source supplies power to the second power source.

In another example embodiment, the switch, in parallel with the inductor, is opened; and the switched capacitor converter and inductor are configured as a 3 level buck converter.

In another example embodiment, the power management device is configured in a reverse mode such that the second power source supplies power to the first port.

In another example embodiment, the reverse mode is a three-level boost converter mode: wherein the switch, in parallel with the inductor, is opened, and wherein the switched capacitor converter and inductor are configured as a 3 level boost converter.

In another example embodiment, further comprising an inner loop power control coupled to the switch; wherein the switch and inner loop power control are configured to regulate power transfer between the first and second ports such that either a voltage or current at the second port is within a first range of voltages or currents.

In another example embodiment, further comprising an outer loop power control coupled to the inner loop power control, the switched capacitor converter, and configured to control to the first power source; wherein the outer loop power control configured to regulate power transfer between the first port and the first power source such that either the voltage or current at the inductor and switch are within a second range of voltages or currents.

In another example embodiment, an absolute value of the second range of voltages or currents is greater than an absolute value of the first range of voltages or currents.

In another example embodiment, the switch is a MOSFET.

In another example embodiment, the switched capacitor converter is configured as a step-down converter.

In another example embodiment, the power management device is an end-to-end battery power device.

According to an example embodiment, a method for power management, comprising: coarsely regulating power transfer between a first power source and a second power source using a switched capacitor converter and voltage or current commands sent to the first power source; and finely regulating power transfer between the first power source and the second power source using an inductor in parallel with a switch, and commands sent to the switch.

According to an example embodiment, a method for power management, comprising: regulating power transfer between a second power source and a first power source using an inductor in parallel with a switch coupled to the second power source, and a switched capacitor converter coupled between the first power source and the inductor in parallel with the switch; and commanding the switch to stay open.

In another example embodiment, regulating includes: regulating power transfer between a battery within a mobile device and an accessory device.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
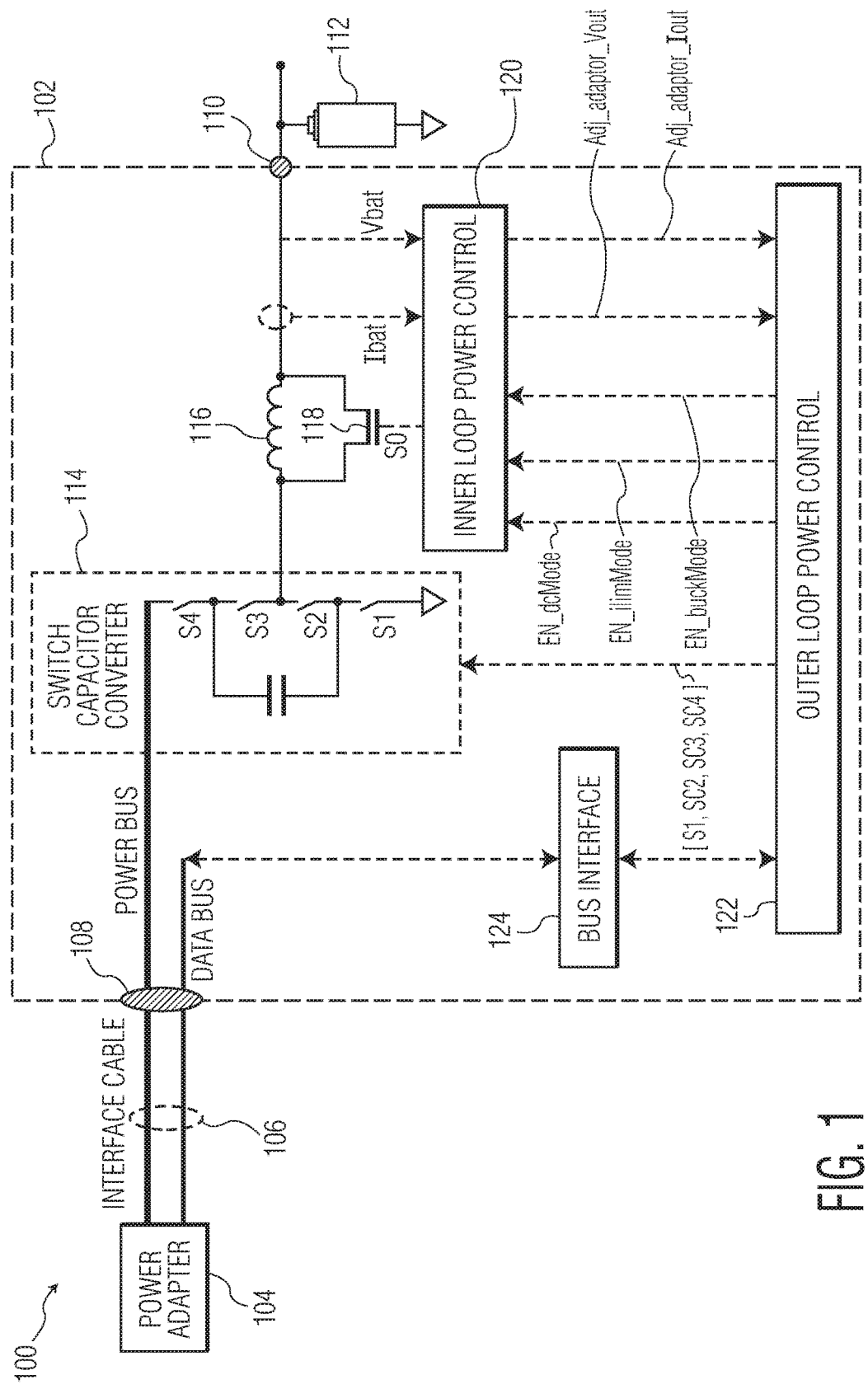
FIG. 1 is an example power management device within a system for power management.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Battery powered devices, such as smartphones, in some example embodiment have a power system that includes of four main components: an AC:DC adaptor which takes power from an AC source and converts it into a DC power source, perhaps having a stable output voltage; a power cable and its associated connectors which carry power/ground and bi-directional communication signals to and from the adapter and a device; a battery within the device; and electronic circuitry within the device, conditions the DC power to compatible levels for use by the battery, for the purpose of charging.

For battery powered devices having a high capacity battery, using low current charging rates, the charging time is relatively long, and may be undesirable from a user experience point of view; however, high current charging (e.g. perhaps at 8 A or more) can substantially reduce charging time.

Charging at too high a current, however, could violate the cable/connector's (e.g. USB standard's) current specification limits. In addition, charging at certain high current rates can create thermal issues at the connector and/or in the cable, reducing reliability.

Furthermore, when charging at high currents, charging circuit efficiency could be compromised or result in heat generation that exceeds certain device and/or system limits (e.g. specifications keeping a smartphone case temperature low and compatible with human touch).

Inductor based switching DC:DC converters can have an efficiency around 90%. However, using an inductor based device to charge at an 8 A rate, while resulting in about 34 W (4.5*8) of output power, will also generate about 3.4 W of heat which can increase a smartphone's case temperature to above 50 deg C., which is usually unacceptable.

Now described is a power system that reduces a current through a power cable/connector for reliability and cost reasons, while simultaneously increasing charging circuit efficiency to perhaps mid-90%, reducing the heat generated.

FIG. 1 is an example power management device 102 within a system 100 for power management. The power system 100 in one example is configured to charge and/or discharge an internally powered device, and includes the power management device 102, a first power source 104 (e.g. power adaptor, AC:DC adaptor, wall outlet, rechargeable battery, etc.), an interface cable 106 having a power bus portion and a data bus portion (e.g. carrying both two-way power and two-way data and/or command signals), a first port 108, a second port 110 (e.g. device output in a "forward" mode or device input in a "reverse" mode), and a second power source 112 (e.g. energy storage device, battery, etc.). In some example embodiments, a host device (e.g. a mobile phone or some other electronic device or circuit) is connected to the second port 110 as well.

The power management device 102 includes a switched capacitor converter 114 (S1, S2, S3, S4, capacitor), an inductor 116, a switch 118 (SO), an inner loop power control 120, an outer loop power control 122, and a bus interface 124.

The power management device 102 is configurable in a variety of modes that either control power transferred from the first power source 104 to the second power source 112 (i.e. forward mode(s)) or between the second power source 112 and the first power source 104 (i.e. reverse mode(s)), which are now described. Note, while FIG. 1 shows an example embodiment of the switched capacitor converter 114 with four switches (S1, S2, S3, S4) (e.g. an example 2:1 stepdown converter), other embodiments with additional switches are possible.

Examples of the power management device 102 operating in a forward mode (e.g. second port 110 functions as an output port) with three sub-modes are now discussed.

In an unregulated direct second port charging mode, the switched capacitor converter 114, inductor 116 and switch 118 (S0) are configured as a stepdown converter (e.g. no inductor 116 buffering). In this mode, the inner loop power control 120 fully turns on the switch 118 (S0) (e.g. switch 118 closed), and the outer loop power control 122 modulates the switched capacitor converter 114 switches (i.e. S1, S2, S3 and S4) such that the switched capacitor converter 114 is operating as a stepdown converter (e.g. in this example, a 2:1 stepdown converter).

In an unregulated limited second port current mode, the switched capacitor converter 114, inductor 116 and switch 118 (S0) are configured as a current source. In this mode, the switch 118 (S0) is turned on by the inner loop power control 120 and the switching frequency of S1, S2, S3, S4 is modulated by the outer loop power control 122. Also the gate driver voltage of the switch 118 (S0) is modulated by the inner loop power control 120.

In a regulated second port voltage mode, the switched capacitor converter 114 and the switch 118 (S0) are configured as a low dropout voltage regulator. In this mode, the switch 118 (S0) is turned on by the inner loop power control 120 and the switching frequency of S1, S2, S3, S4 is modulated by the outer loop power control 122. Also the gate driver voltage of the switch 118 (S0) is modulated by the inner loop power control 120.

An example of the power management device 102 operating in a three-level buck mode is now discussed. In this mode the inner loop power control 120 fully turns off the switch 118 (S0) (e.g. switch 118 open), and the outer loop power control 122 modulates the switched capacitor converter 114 switches (i.e. S1, S2, S3 and S4) such that the switched capacitor converter 114 and the inductor 116 are working together as a 3 level buck converter.

Now discussed is an example of the power management device 102 operating in a reverse mode (e.g. second port 110 functions as an input port). In one example, the reverse mode is a high-voltage accessory power mode.

In the reverse mode (e.g. three-level boost converter) the inner loop power control 120 fully turns off the switch 118 (S0) (e.g. switch 118 open), and the outer loop power control 122 modulates the switched capacitor converter 114 switches (i.e. S1, S2, S3 and S4) such that the switched capacitor converter 114 and the inductor 116 are working together as a 3 level boost converter. In this way power is transferred from the second power source 112 (e.g. a battery) to the first port connected to the interface cable (e.g. to the first power source 104).

Note that in some examples of the forward switched capacitor direct charging mode, there are significant impedance sources in the path from the first power source 104 (e.g. power adaptor, AC:DC adaptor) to the second power source 112 (e.g. energy storage device, battery) including cable impedance, connector impedance, OVP (overvoltage protection) impedance, switched capacitor converter 114 impedance, board impedance, PCM impedance and PTC impedance, etc., and sudden changes in system load due to host device (e.g. a mobile phone) could lead to voltage fluctuations.

In such a scenario, it may not be possible to tightly regulate the second power source's 112 (e.g. battery's) charging profile using only outer loop power control 122 of the first power source 104 (e.g. power adaptor, AC:DC adaptor), since when the current is high, regulating the output tightly would generate high energy losses and transfer associated heat into a host device (e.g. a smartphone). Moreover, standardization efforts and cost pressures of direct charging could result in poor quality ACDC adapters that require additional safety circuits.

However, with the inner loop power control 120, providing local power regulation functions (e.g. inner power regulating loop 202), the second power source's 112 (e.g. battery's) charging profile can be such tightly regulated. Example solutions for local regulation can be: a linear regulation load switch in series with the switched capacitor DCDC converter, a switched capacitor DCDC converter that can work in variable frequency mode or switches within the switched capacitor DCDC converter that can work in linear mode, similar to a separate linear regulator to provide fine (e.g. tight), but a small amount of regulation.

When very tight power regulation is required for a lengthy period, like in a CV battery charging phase, it is better to use a regulated output mode. To protect the second power source 112 (e.g. energy storage device, battery) from output glitches when the system transitions from current regulation to voltage regulation, a transition region can be defined using the battery voltage (i.e. transition_start_voltage=CV_threshold, and transition_end_voltage=CV_threshold+delta_V). Upon entry of this transition region, first decrease the CC charging current until it is a predefined level, then turn on the CV regulation. By doing so, the battery voltage glitches created from going from CC (constant current) regulation to CV (constant voltage) regulation can be minimized.

Using the power management device 102 described above, overall current reduction is accomplished by configuring the switched capacitor converter 114 as a step-down voltage converter which operates by using a higher input voltage from the first power source 104 (e.g. power adaptor) than required by the second power source 112 (e.g. battery), thereby reducing the current proportionally as the ratio of output voltage over input voltage and maintaining the same amount of delivered power.

The power management device 102 also achieves high efficiency by using the switched capacitor converter 114 topology having switches (S1, S2, S3, S4) with low on-resistance and configuring the outer loop power control 122 to use low power switch driver techniques such as adiabatic and/or resonant switching.

In addition, cascading a buck-boost regulator (e.g. inductor 116 and switch 118) after the switched capacitor converter 114 improves efficiency. An additional benefit of the buck-boost regulator topology is that, when configured in the reverse mode, can supply accessory power back to the power management device's 102 first port 108 (e.g. input connector), similar to an inductive solution.

Figure 2:
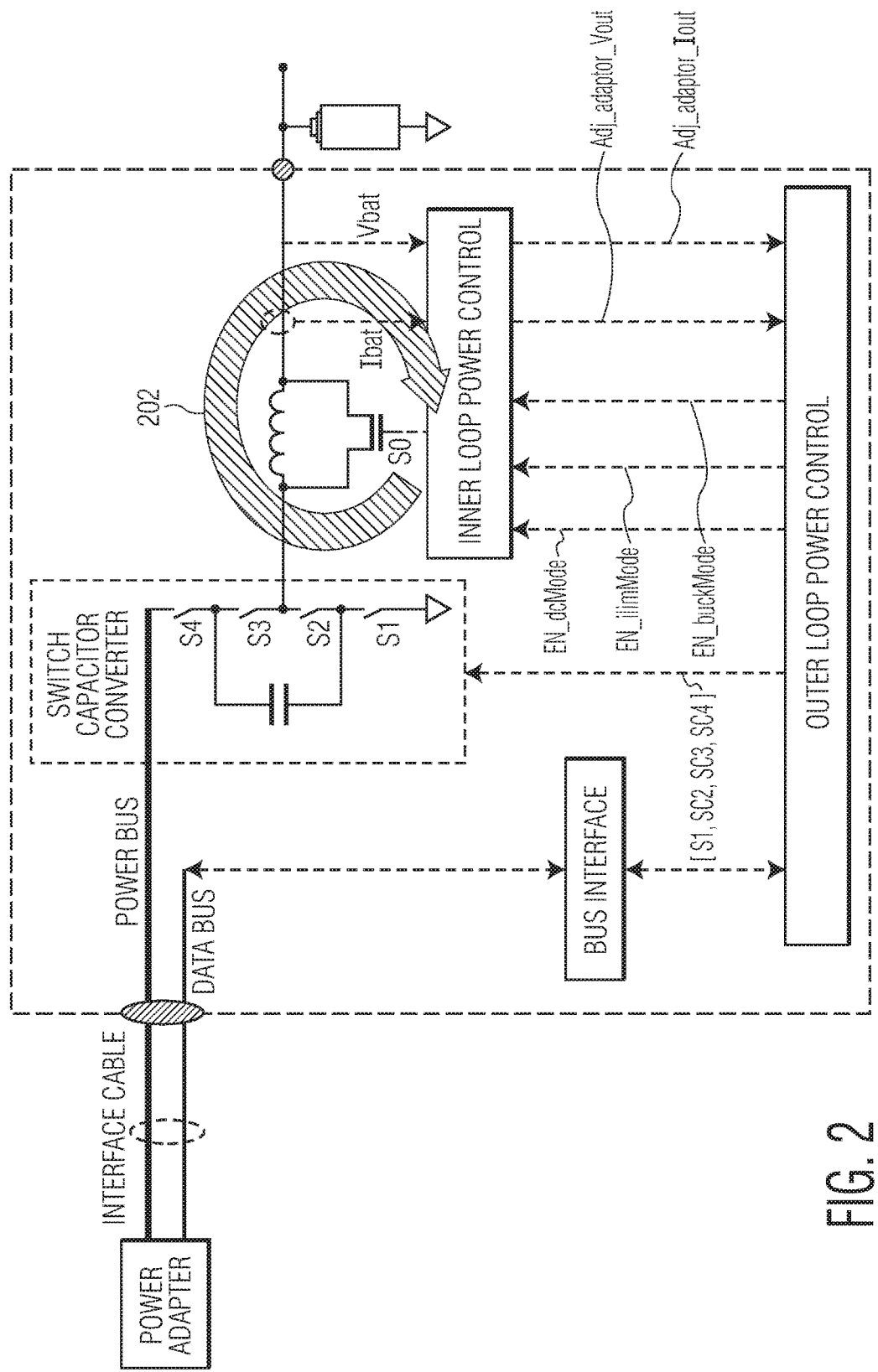
FIG. 2 is an example inner regulating loop within the power management device.

FIG. 2 is an example inner power regulating loop 202 within the power management device 102. The inner power regulating loop 202 includes the inductor 116, the switch 118 (S0) and the inner loop power control 120.

The inner power regulating loop 202 is used during the following modes: the three-level buck mode, the limited second port current mode; and the regulated second port voltage mode.

Ibat and Vbat signals are used to control the biasing of the switch 118 (S0) such that the switch 118 (S0) can be biased either as a current source or a low dropout voltage regulator. These modes can be achieved with the switch 118 (S0) turned on and modulating the switching frequency of S1, S2, S3, S4, or, these modes can be achieved with the switch 118 (S0) turned on and changing the gate driver voltage.

The inner power regulating loop 202 is not limited by the topology of switched capacitor converter 114.

Figure 3:
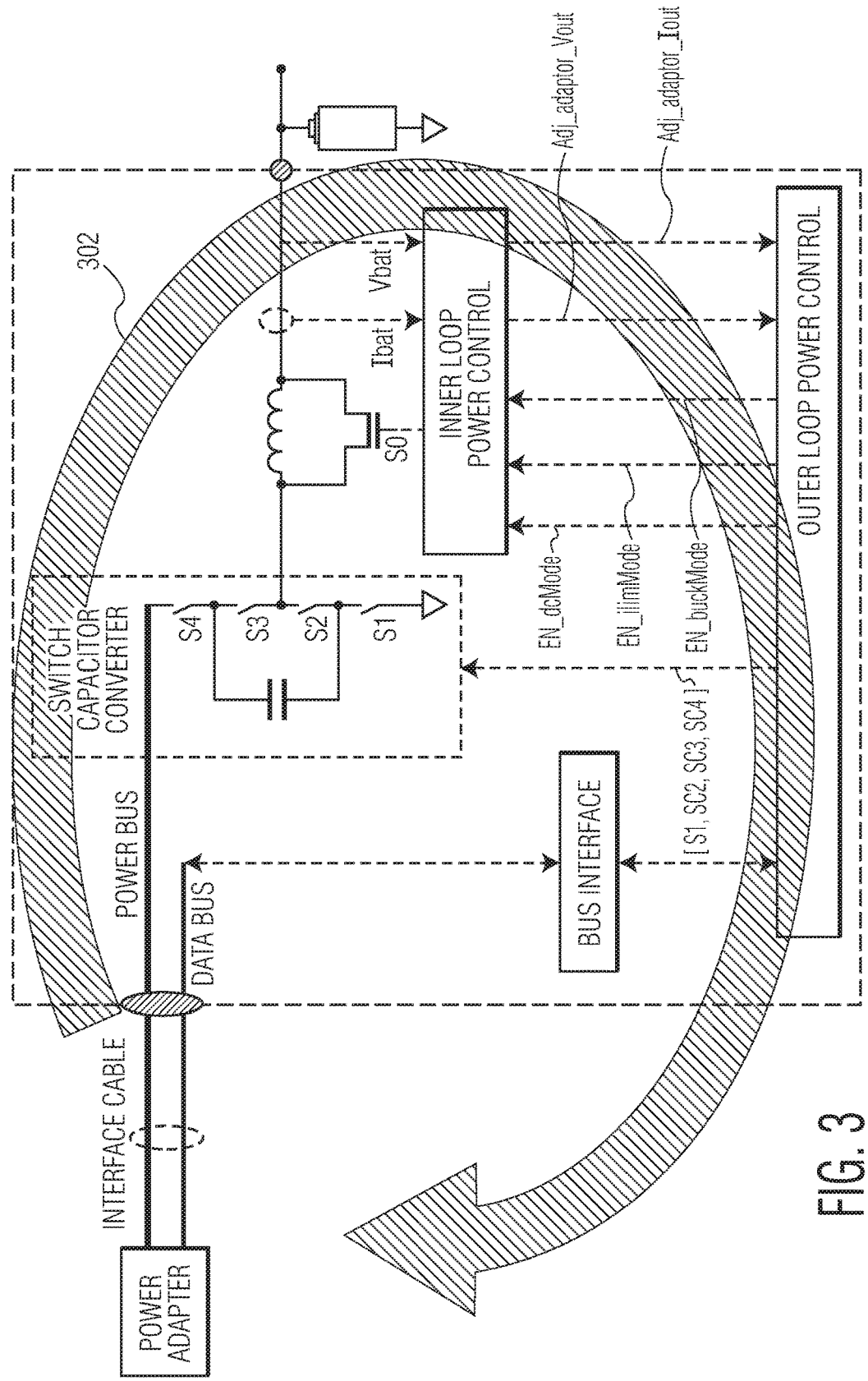
FIG. 3 is an example outer regulating loop within the power management device.

FIG. 3 is an example an outer power regulating loop 302 within the power management device 102. The outer power regulating loop 302 includes the inner loop power control 120, the switched capacitor converter 114 and the first power source 104.

The outer power regulating loop 302 is used to adjust the first power source 104 output voltage such that the inner power regulating loop 202 can work efficiently without excessive power loss. The outer loop power control 122 will send coarse adjustment signals to the first power source 104 through the bus interface 124 and over the interface cable 106 data bus. The outer power regulating loop 302 includes an optimization algorithm that can take a variety of forms.

MEPT (Maximum Efficiency Point Tracking) is one such algorithm. An MEPT algorithm can compensate for when there is a mismatch between the ACDC output and the battery charging current and make the necessary current/voltage changes. For example, to charge the battery at 6 A, using a switched capacitor DCDC converter in a 2:1 unregulated mode, set the ACDC adapter current to 3 A. However, because of impedance, loss and non-ideal behavior of switched capacitor DCDC converter, the battery current will be less than the desired 6 A, typically around 5.6 A. In this case, increase the ACDC current slightly to achieve 6 A current charging at the battery.

This is similar to a perturb and observation MPPT (Maximum Power Point Tracking) algorithm, and can be used to track the battery current. The MPPT algorithm can also optimize the system for maximum efficiency and reduced heat generation by adjusting the ACDC output. For example, when in CV charging mode, the MPPT can lower the ACDC voltage to the minimum level allowed by the charging system for proper regulation and raise this level as the battery voltage increases during the charging cycle thereby minimizing power loss.

Thus by using the outer power regulating loop 302, the overall power system 100 performance and efficiency can be optimized by monitoring the input power at the first port 108 and the output power at the second port 110, and in response adjusting the first power source 104 output voltage.

Figure 4:
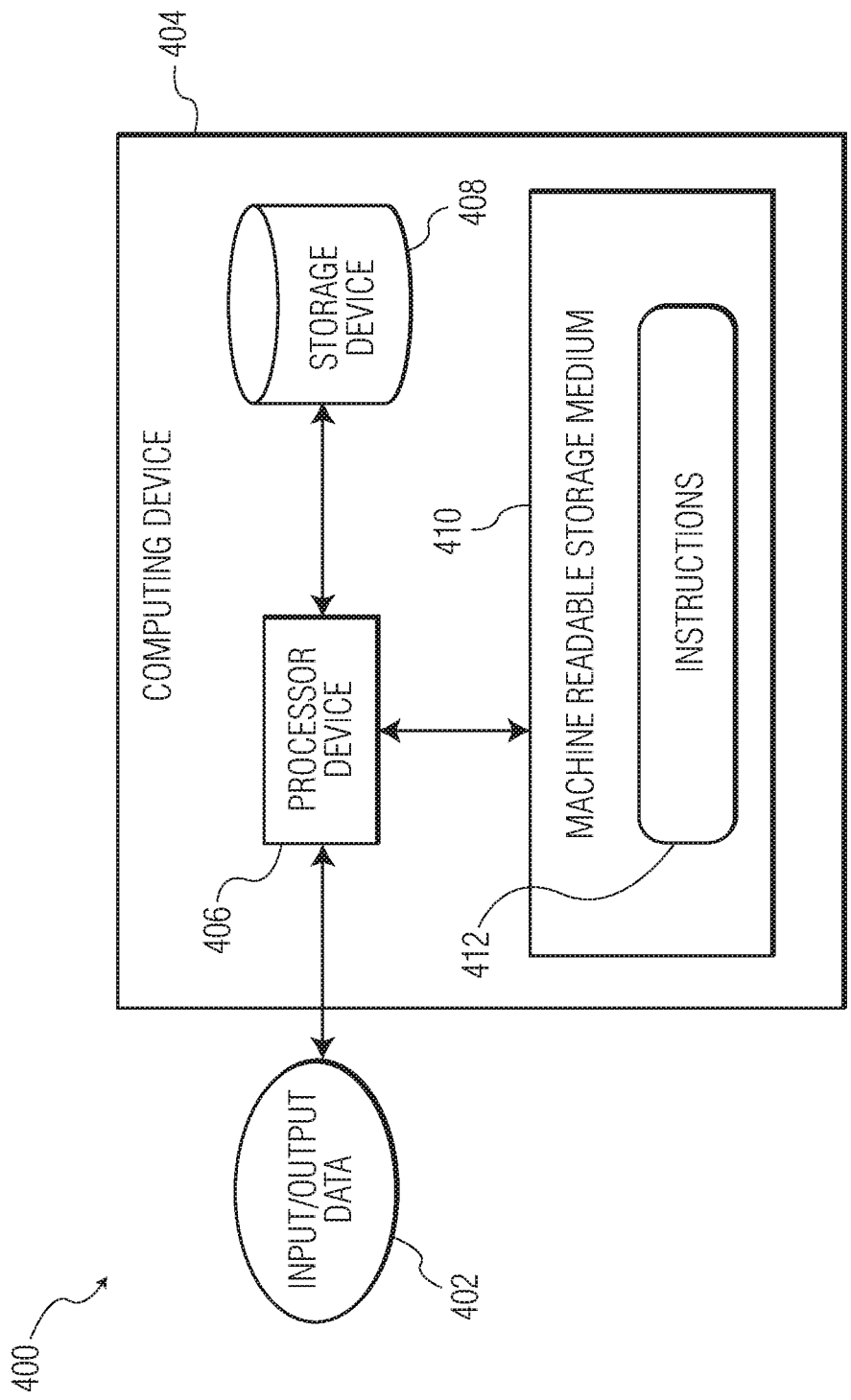
FIG. 4 is an example system for hosting instructions for operating the power management device.

FIG. 4 is example system 400 for hosting instructions for operating the power management device (i.e. effecting the sense, command and control functions of the inner loop power control 120 and the outer loop power control 122).

The system 400 shows an input/output data 402 interface with an electronic apparatus 404. The electronic apparatus 404 includes a processor 406, a storage device 408, and a non-transient machine-readable storage medium 410. The machine-readable storage medium 410 includes instructions 412 which control how the processor 406 receives input data 402 and transforms the input data into output data 402, using data within the storage device 408. Example instructions 412 stored in the machine-readable storage medium 410 are discussed elsewhere in this specification. The machine-readable storage medium in an alternate example embodiment is a non-transient computer-readable storage medium.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A power management device, comprising:
    a first port configured to be coupled to a first power source;
    a second port configured to be coupled to a second power source;
    a switched capacitor converter;
    an inductor coupled in parallel with a switch;
    wherein the switched capacitor converter is coupled between the first port and one end of the inductor coupled in parallel with the switch;
    wherein another end of the inductor coupled in parallel with the switch, is coupled to the second port;
    a first power controller configured to regulate power transfer between the first power source and the second power source using commands sent to the first power source; and
    a second power controller configured to regulate power transfer between the first power source and the second power source using commands sent to the switch.

2. The device of claim 1:
    wherein the first power source is at least one of: a power adaptor, an AC:DC adaptor, a rechargeable battery, a mobile device, a computer, or a USB-bus compatible device; and
    wherein the second power source is at least one of: an energy storage device, a battery, a mobile device, or a USB-bus compatible device.

3. The device of claim 1:
    wherein the power management device is configured in a forward mode such that the first power source supplies power to the second power source.

4. The device of claim 3, wherein the forward mode is a direct second port charging mode:
    wherein the switch, in parallel with the inductor, is closed, and
    wherein the switched capacitor converter is configured as a stepdown converter.

5. The device of claim 3, wherein the forward mode is a limited second port current mode:
    wherein the switched capacitor converter, inductor and switch are configured as a current source; and
    wherein the switched capacitor converter and switch are modulated by coarse and fine power controllers respectively.

6. The device of claim 3, wherein the forward mode is a regulated second port voltage mode:
    wherein the switched capacitor converter and the switch are configured as a low dropout voltage regulator; and
    wherein the switched capacitor converter and switch are modulated by coarse and fine power controllers respectively.

7. The device of claim 1:
    wherein the power management device is configured in a three-level buck mode such that the first power source supplies power to the second power source.

8. The device of claim 7:
    wherein the switch, in parallel with the inductor, is opened; and
    wherein the switched capacitor converter and inductor are configured as a 3 level buck converter.

9. The device of claim 1:
    wherein the power management device is configured in a reverse mode such that the second power source supplies power to the first port.

10. The device of claim 9, wherein the reverse mode is a three-level boost converter mode:
    wherein the switch, in parallel with the inductor, is opened, and
    wherein the switched capacitor converter and inductor are configured as a 3 level boost converter.

11. The device of claim 1:
    wherein the second power controller is an inner loop power control coupled to the switch;
    wherein the switch and the inner loop power control are configured to regulate power transfer between the first and second ports such that either a voltage or current at the second port is within a first range of voltages or currents.

12. The device of claim 11:
    wherein the first power controller is an outer loop power control coupled to the inner loop power control, the switched capacitor converter, and is configured to control the first power source;
    wherein the outer loop power control is configured to regulate power transfer between the first port and the first power source such that either a voltage or current at the one end of the inductor and switch is within a second range of voltages or currents.

13. The device of claim 12:
    wherein an absolute value of the second range of voltages or currents is greater than an absolute value of the first range of voltages or currents.

14. The device of claim 1:
    wherein the switch is a MOSFET.

15. The device of claim 1:
    wherein the switched capacitor converter is configured as a step-down converter.

16. The device of claim 1:
    wherein the power management device is an end-to-end battery power device.

17. A method for power management, comprising:
    coarsely regulating power transfer between a first power source and a second power source using a switched capacitor converter and voltage or current commands sent to the first power source; and
    finely regulating power transfer between the first power source and the second power source using an inductor in parallel with a switch, and commands sent to the switch.

* * * * *